(12) United States Patent
Tanaka (10) Patent No.: US 8,098,386 B2
(45) Date of Patent: Jan. 17, 2012

(54) IMAGE MANAGEMENT SYSTEM, IMAGE OUTPUT APPARATUS, AND COMPUTER READABLE MEDIUM FOR SECURITY ENHANCEMENT

(75) Inventor: Kazuyoshi Tanaka, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1183 days.

(21) Appl. No.: 11/822,976

(22) Filed: Jul. 11, 2007

(65) Prior Publication Data

US 2008/0018931 A1 Jan. 24, 2008

(30) Foreign Application Priority Data

Jul. 20, 2006 (JP) .................................. 2006-198131

(51) Int. Cl.
*G06F 3/12* (2006.01)
*G06F 13/00* (2006.01)
*G06F 15/173* (2006.01)
*G06F 17/30* (2006.01)

(52) U.S. Cl. ...................... 358/1.14; 358/1.15; 358/1.16

(58) Field of Classification Search ........ 358/1.13–1.17, 358/524, 403, 404, 444; 709/226, 212
See application file for complete search history.

(56) References Cited

U.S. PATENT DOCUMENTS

| | | | | |
|---|---|---|---|---|
| 6,188,488 B1 * | 2/2001 | Kato | ............................ | 358/1.16 |
| 6,424,429 B1 * | 7/2002 | Takahashi et al. | ........... | 358/1.16 |
| 6,597,469 B1 | 7/2003 | Kuroyanagi | | |
| 7,146,389 B2 * | 12/2006 | Ebata et al. | ............ | 707/999.205 |
| 7,389,414 B2 * | 6/2008 | Hibino et al. | ................. | 709/228 |
| 7,557,947 B2 * | 7/2009 | Nakata et al. | ................ | 358/1.15 |
| 7,639,385 B2 * | 12/2009 | Nakata et al. | ................ | 358/1.16 |
| 7,733,514 B2 * | 6/2010 | Kano et al. | .................... | 358/1.15 |
| 2002/0140978 A1 * | 10/2002 | Urabe et al. | ................. | 358/1.16 |
| 2006/0050291 A1 * | 3/2006 | Morikawa et al. | .......... | 358/1.13 |
| 2008/0130044 A1 * | 6/2008 | Yamada | ..................... | 358/1.15 |
| 2010/0128298 A1 * | 5/2010 | Matsugashita | .............. | 358/1.13 |
| 2010/0188699 A1 | 7/2010 | Ida et al. | | |

FOREIGN PATENT DOCUMENTS

JP 6-233040 8/1994

(Continued)

OTHER PUBLICATIONS

Japanese Office Action dated May 19, 2009.

*Primary Examiner* — Scott A Rogers (74) *Attorney, Agent, or Firm* — Finnegan, Henderson, Farabow, Garrett & Dunner, L.L.P.

(57) ABSTRACT

Disclosed herein is an image management system, including: an image output apparatus which outputs an image data to various types of media, and a server, wherein the image output apparatus and the server are connected via a communication network, and the image output apparatus includes: an obtaining unit to obtain user information when the image data is output, a history storage unit to accumulate and store the user information which is obtained by the obtaining unit and the image data which is output as history information so as to correspond to one another, a history transfer unit to transfer the history information which is stored in the history storage unit to the server, and a deletion unit to delete the history information which is transferred by the history transfer unit from the history storage unit, and the server includes: a receiving unit to receive the history information which is transferred from the image output apparatus, and a history management unit to accumulate and store the history information which is received by the receiving unit.

18 Claims, 9 Drawing Sheets

FOREIGN PATENT DOCUMENTS

| | | |
|---|---|---|
| JP | 2000-188660 | 7/2000 |
| JP | 2002-10004 | 1/2002 |
| JP | 2003-158705 | 5/2003 |
| JP | 2004-102549 | 4/2004 |
| JP | 2004-112517 | 4/2004 |
| JP | 2006-116746 | 5/2006 |

* cited by examiner

| JOB INFORMATION /D1 | IMAGE DATA /D3 |

USER INFORMATION LIST *190*

| USER NAME | PASSWORD |
|---|---|
| YAMADA | 1234 |
| TANAKA | 5678 |
| ⋮ | ⋮ |

FIG.3C

MONITORING TARGET USER LIST *192*

| USER NAME |
|---|
| YAMADA |
| ⋮ |

FIG.4

HISTORY INFORMATION TABLE *194*

| USER NAME | DATE INFORMATION | IMAGE DATA | OUTPUT JOB INFORMATION |
|---|---|---|---|
| YAMADA | 2005/11/25 |  | ·COPY<br>·3 COPIES |
| | 2005/11/25 |  | ·SCANMAIL<br>·1 COPY<br><br>·tokkyo@tokkyo.jp |
| | ⋮ | ⋮ | ⋮ |
| TANAKA | ⋮ | ⋮ | ⋮ |
| | ⋮ | ⋮ | ⋮ |

IMAGE MANAGEMENT SYSTEM, IMAGE OUTPUT APPARATUS, AND COMPUTER READABLE MEDIUM FOR SECURITY ENHANCEMENT

BACKGROUND OF THE INVENTION

1. Field of the Invention

The present invention relates to an image management system in which an image output apparatus which outputs an image data to various types of media and a server are connected via a communication network, the image output apparatus, and a computer readable medium.

2. Description of Related Art

In recent years, improvement of security is also emphasized in an image output apparatus such as a copier, a printer, an MFP (Multi Function Peripheral; complex machine) and the like from a viewpoint of information management and the like of companies, and techniques for security enhancement are being developed. As an example, there is known a technique of storing evidences of illegalities without deleting the image data when certain characteristics such as the characteristics of paper money and securities are included in the image data which is read by an image reading unit (see JP2004-112517A, hereinafter, referred to as Patent Document 1).

Further, there is known a technique of assuring highly reliable photographed image which is not altered by managing the image in the same condition as the condition when the image was photographed through sequentially transmitting the image data obtained by the photographing to the server of an image storage center for every photographing by a digital camera (see JP2003-158705A, hereinafter, referred to as Patent Document 2).

However, in case where the image output apparatus is used by unspecified number of people such as in a company and the like, there is a possibility that the image output apparatus may be used illegally, for example, the documents which include confidential information are copied by an unauthorized user and the documents are printed for personal use. Therefore, there is a need to regulate and manage the illegalities of users by recording the usage history of the image output apparatus.

In the technique of Patent Document 1 described above, the illegalities can be regulated by determining whether certain characteristics are included in the image data or not. However, it is technically difficult to determine whether the content of the document includes a highly confidential document within the company or not, or whether the content of the document is the document for a personal user or not from the image data. Therefore, a method of simply storing all of the image data which are output in a storage device can be easily realized.

However, when there are a plurality of image output apparatuses, the usage history needs to be managed by referring to the storage devices of each image output apparatus. Thus, the operation of an operator becomes complicated. Further, it is considered that, by applying the technique of Patent Document 2, the image data which is output by the image output apparatus is sequentially transferred to the server and then, unified management of the image data is carried out by the server. However, the sequential transfer of the image data to the external server for every image output may cause the decrease of the processing rate of the image output. Thus, there is a problem that the overloaded condition occurs continuously.

SUMMARY

In view of the above problem, an object of the present invention is to realize a user-friendly management of usage history of the image output apparatus without decreasing the processing rate of the image output.

In order to achieve the above-described object, in accordance with an embodiment according to the first aspect of the present invention, an image management system, comprises: an image output apparatus which outputs an image data to various types of media, and a server, wherein the image output apparatus and the server are connected via a communication network, and the image output apparatus comprises: an obtaining unit to obtain user information when the image data is output, a history storage unit to accumulate and store the user information which is obtained by the obtaining unit and the image data which is output as history information so as to correspond to one another, a history transfer unit to transfer the history information which is stored in the history storage unit to the server, and a deletion unit to delete the history information which is transferred by the history transfer unit from the history storage unit, and the server comprises: a receiving unit to receive the history information which is transferred from the image output apparatus, and a history management unit to accumulate and store the history information which is received by the receiving unit.

Preferably, the server further comprises: a periodic request transmission unit to transmit a transfer request of the history information to the image output apparatus in a predetermined time zone, and the image output apparatus further comprises a request determination unit to determine whether the transfer request is received from the server or not, and the history transfer unit comprises: a periodic transfer unit to transfer the history information which is stored in the history storage unit to the server when the request determination unit determines that the transfer request is received.

Preferably, the image output apparatus further comprises: a space obtaining unit to obtain an available space in the history storage unit, and a space determination unit to determine whether the available space obtained by the space obtaining unit is not more than a predetermined space or not, and the history transfer unit comprises: a space insufficient occasion transfer unit to transfer the history information which is stored in the history storage unit to the server when the space determination unit determines that the available space is not more than the predetermined space.

Preferably, the image output apparatus further comprises: a user information storage unit to store user information which is registered in advance, and a user information determination unit to determine whether the user information obtained by the obtaining unit and the user information stored in the user information storage unit match or not, and the history transfer unit comprises: a registered user transfer unit to immediately transfer the history information which includes the user information stored in the history storage unit to the server.

Preferably, the image output apparatus further comprises: a first output stopping unit to stop the output of the image data while the history information is being transferred.

Preferably, the image output apparatus further comprises: a transfer completion determination unit to determine whether the transfer of the history information has completed successfully or not, and a second output stopping unit to stop the output of the image data when the transfer completion determination unit determines that the transfer of the history information has not completed successfully.

Preferably, the output of the image data includes at least one of an output of an image data which is forming of an image on a recording medium based on the image data and an output of the image data which is transmission of the image data to the communication network.

Preferably, the obtaining unit further obtains output job information which indicates an output condition relating to the image data, and the history storage unit further accumulates and stores the output job information as the history information so as to correspond to the user information and the image data.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF THE PREFERRED EMBODIMENT

Figure 1:
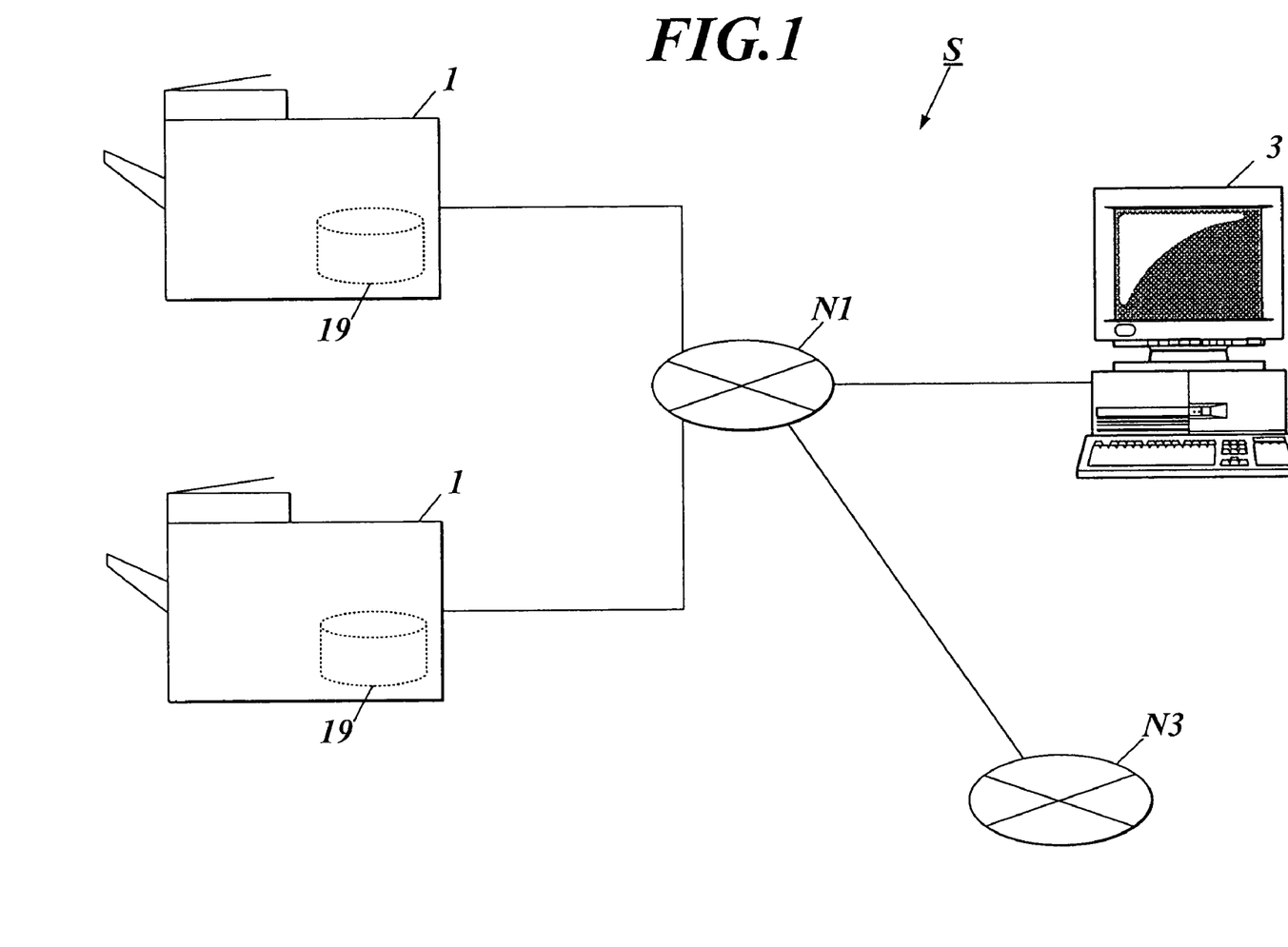
FIG. 1 is a diagram showing an example of the system structure of an image management system.

Hereinafter, an embodiment of an image management system in case where the image output apparatus of the present invention is applied to the MFP 1 shown in FIG. 1 will be described with reference to FIGS. 1 to 9. In the embodiment, a description is given for the case where the image output apparatus is applied to an MFP (complex machine). However, the image output apparatus may be applied to other image output apparatuses such as a printer, a copier, a facsimile, or the like, for example.

[Outline of the Image Management System]

First, an overview of an image management system S shown in FIG. 1 will be described. As shown in FIG. 1, the image management system S is composed by a plurality of MFP 1 connecting to an administration server 3 via a communication network N1. Further, the communication network N1 is connected to a public network N3 which is an internet, a telephone network, or the like, and the image management system S is composed so as to carry out a data communication with an external terminal on the public network N3.

The MFP 1 is an image output apparatus which outputs an image data to various types of media. As a function of image output, there is a copy function which forms and outputs an image of a document which is scanned and read from an after-mentioned scanner unit 13 on a recording medium which is a transfer paper or the like. Moreover, there is a function called a scanmail function which transmits and outputs an image data of the scanned image on the communication network N1 and the public network N3 as an attachment file of an E-mail.

Here, the unit of a series of operations carried out by the MFP 1 is called "job", and a job which is carried out when the copy function is performed is called "copy job" and a job which is carried out when the scanmail function is performed is called "scanmail job". The file which is generated for every job is called "job file" and is created by the MFP 1 when the document is being scanned.

Figure 3A:
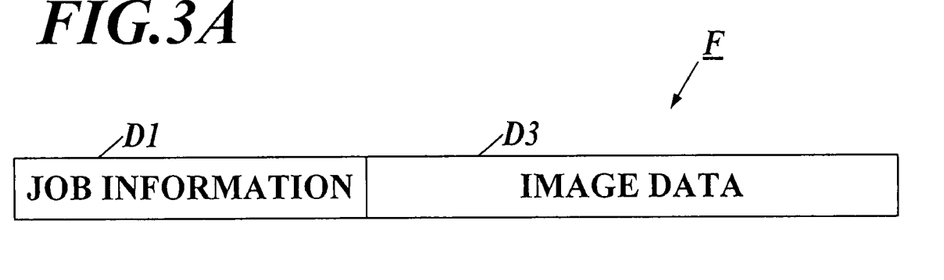
FIG. 3A is a diagram showing an example of the data structure of a job file.

An example of the data structure of a job file F is shown in FIG. 3A. As shown in FIG. 3A, the job file F comprises job information D1 and an image data D3. The job information D1 is setting information which shows contents of the job such as number of pages, number of copies, paper size, and output medium, and is described in the JDF (Job Messaging Format), for example. The job information D1 is set based on the setting operation of a user or a default.

The image data D3 is an image data of the document which is read from the scanner unit 13, and is a data in the vector format or the bit map format, for example. The image data D3 is output to various types of media such as the recording medium, the communication network N1, and the like based on the job file F.

When a user outputs the image data D3 on a medium, the user first inputs the user information which is the user name and the password. The print function and the scanmail function can be used when the user is authenticated by the user information. When the user inputs the user information, the image data D3 is accumulated and stored in the HDD (Hard Disk Drive) 19 along with the user information.

The user information and the image data D3 which are stored in the HDD 19 are deleted from the HDD 19 after being periodically transferred to the administration server 3 in a predetermined time zone (for example, AM0:00 to 1:00). The available space in the HDD 19 is managed so as to constantly maintain a space of not less than a certain space.

[Structure of the MFP]

Figure 2:
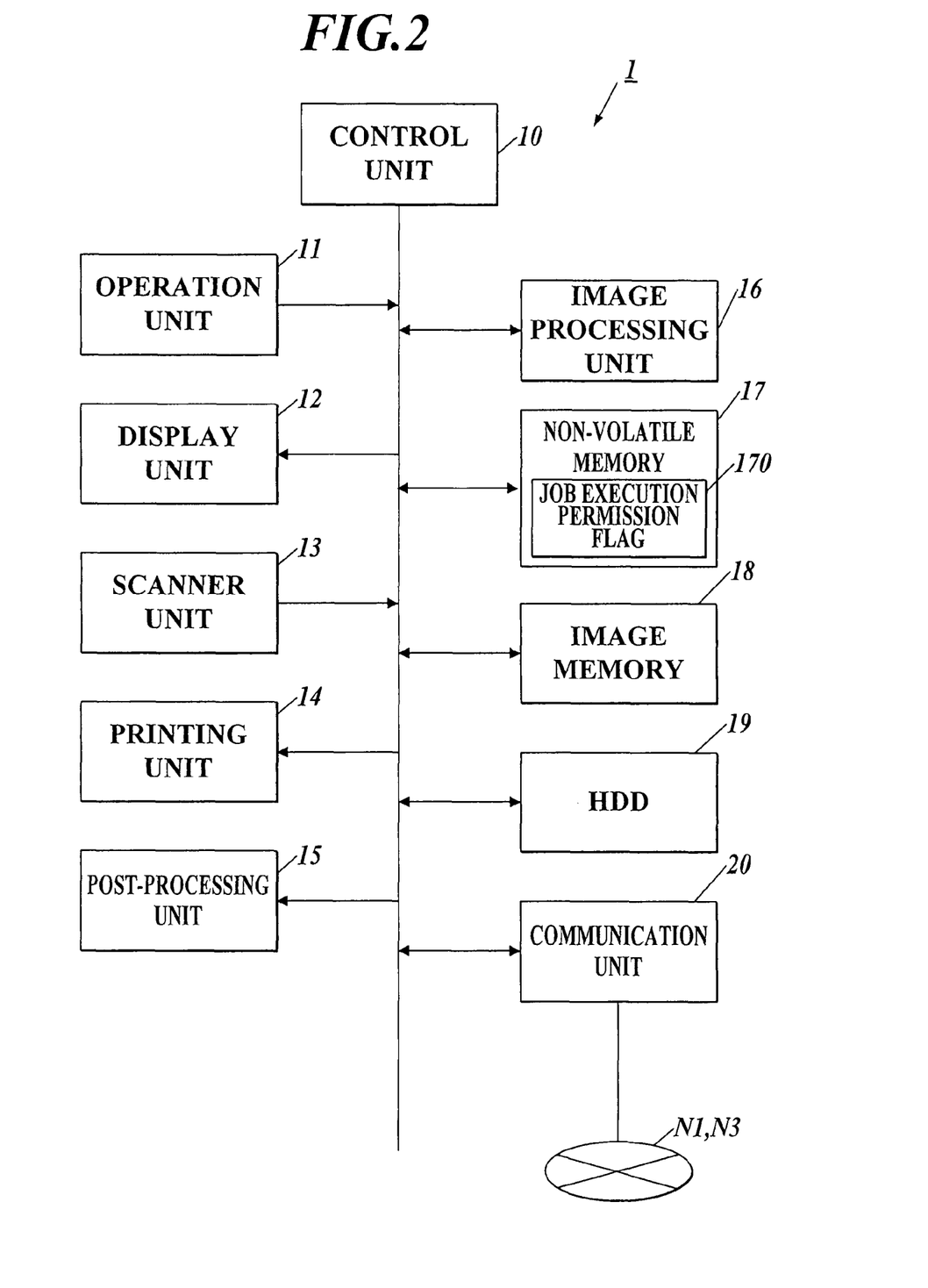
FIG. 2 is a block diagram showing an example of the functional structure of an MFP.
Figure 3B:
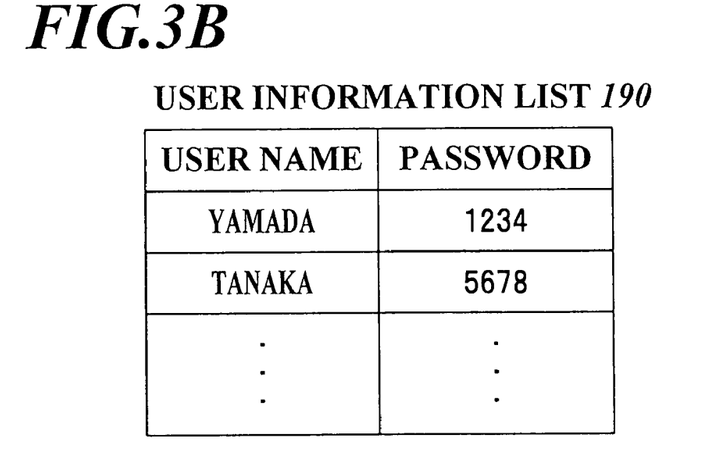
FIG. 3B is a diagram showing an example of the data structure of a user information list.
Figure 3C:
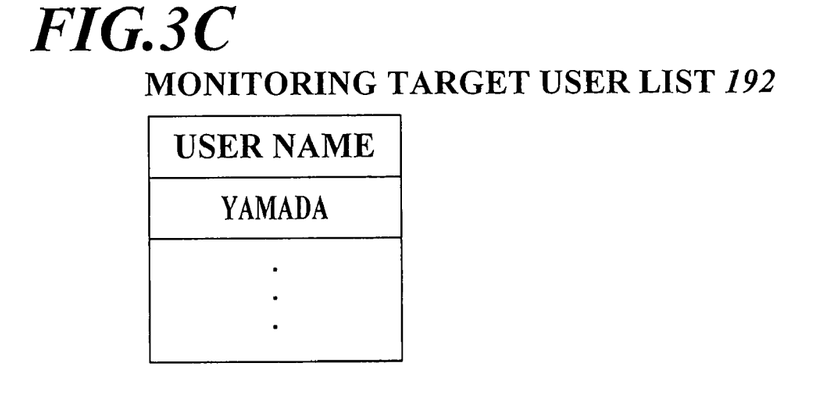
FIG. 3C is a diagram showing an example of the data structure of a monitoring target user list.

Next, the functional structure of an MFP 1 will be described with reference to FIGS. 2 to 4. FIG. 2 is a block diagram showing an example of the functional structure of the MFP 1. According to FIG. 2, the MFP 1 comprises a control unit 10, an operation unit 11, a display unit 12, the scanner unit 13, a printing unit 14, a post-processing unit 15, an image processing unit 16, a non-volatile memory 17, an image memory 18, the HDD 19, and a communication unit 20.

The control unit 10 comprises a CPU (Central Processing Unit), a ROM (Read Only Memory), a RAM (Random Access Memory), and the like, and controls the instructions given to each functional unit which composes the MFP 1, the data communications between the functional units, and the like. More particularly, the CPU reads out a program from the ROM based on an operational signal which is output from the operation unit 11 and carries out the process according to the program. Further, the CPU temporarily stores the processing result in the RAM, and allows the display unit 12 to display the processing result.

The operation unit 11 comprises a group of various types of keys such as a start key, a cancel key, a ten key, a cursor key, and the like, a touch panel, and the like, and outputs a push signal corresponding to the pushed key and operational signals such as a positional signal corresponding to the position where the touch panel is in contact and the like to the control unit 10.

The display unit 12 comprises the CRT (Cathode Ray Tube), the LCD (Liquid Crystal Display), or the like, and outputs and displays various types of setting screens, an image condition, operational situation of each function, and the like based on the instructions/control from the control unit 10. The control unit 10 allows the display unit 12 to display various types of setting screens, creates the job information D1 based on the content of setting which is selected/determined by an operation of the operation unit 11, and stores the created job information D1 in the non-volatile memory 17.

The scanner unit 13 comprises a platen glass, a CCD (Charge Coupled Device), and a light source, and optically reads the document and generates the image data D3. Particularly, the scanner unit 13 reads an image of the document by imaging and photoelectrically converting the reflected light of the light which performed scanning by illuminating the document mounted on the ADF (Auto Document Feeder) unit from the light source by the CCD. Then, the scanner unit 13 generates the image data D3 of the image and outputs the image data D3 to the image processing unit 16.

The printing unit 14 comprises an LD (Laser Diode), a photosensitive drum, an charger, a developer, a transfer unit, a fixer, a paper feeding roller to convey the recording medium along the conveyance rout, and the like, and forms an image based on the image data D3 on the recording medium.

Particularly, the printing unit 14 feeds the recording medium having a predetermined size in a predetermined direction and conveys the recording medium on the conveyance rout based on the instruction of the image processing unit 16. Further, the printing unit 14 charges a surface of the photosensitive drum by the charger, and forms an electrostatic latent image on the surface of the photosensitive drum by irradiating a laser beam based on the PWM (Pulse Width Modulation) signal which is input from the image processing unit 16. Subsequently, the printing unit 14 allows a toner to adhere to a region which includes the electrostatic latent image of the surface of the photosensitive drum by the developer, and forms the image by transferring the toner on the conveyed recording medium by the transfer unit. Then, the transferred image is conveyed to the post-processing unit 15 after being fixed by the fixer.

The post-processing unit 15 comprises a staple unit, a punch unit, and the like, and carries out a predetermined post-processing for the recording medium which is conveyed from the printing unit 14. The control unit 10 outputs the instruction based on the job information D1 in the job file F to the post-processing unit 15. The post-processing unit 15 suitably accumulates the conveyed recording medium on a stacker and staples or punches the recording medium based on the instruction from the control unit 10. Then, the post-processing unit 15 discharges the recording medium on a tray according to the instruction of the control unit 10.

The image processing unit 16 comprises a multiple-processor or the like, and carries out various types of image processing for the image data D3. Particularly, the image processing unit 16 compresses the image data D3 which is generated by the scanner unit 13 after carrying out correction processes such as a shading correction, a brightness density conversion, a density γ conversion, an inclination correction, and the like for the image data D3, and temporarily stores the compressed image data D3 in a compression memory of an image memory 18. Further, when the control unit 10 instructs to read out the image, the image processing unit 16 expands the compressed image data D3 and temporarily stores the expanded image data D3 in a page memory of the image memory 18.

When the image processing unit 16 is instructed to start printing from the control unit 10, the image processing unit 16 reads out the uncompressed image data D3 from the page memory on a page by page basis, and carries out scaling, changing of direction, and the like for the image data D3 based on the job information D1 which is stored in the non-volatile memory 17. Further, the image processing unit 16 generates the PWM signal based on the image data D3 after carrying out the image processing such as the γ correction process, the screen processing, and the like to the image data D3, and outputs the PWM signal to the printing unit 14.

The communication unit 20 is a functional unit to carry out a data communication with external devices such as the administration server 3, other MFP 1, and the like via the communication network which are the communication network N1 or the public network N3. The communication unit 20 comprises a modem, a LAN interface, or the like.

The non-volatile memory 17 comprises a semiconductor memory which can read and write data or the like, and stores various types of setting data according to the image forming and the job information D1. Further, the non-volatile memory 17 stores a job execution permission flag 170 as shown in FIG. 2.

The job execution permission flag 170 is a flag (on or off) which indicates whether the job is executable or not and is updated by the control unit 10. When the user information and the image data D3 are transferred to the administration server 3 from the MFP 1, the job execution permission flag 170 is set to off, and the job cannot be executed during the transfer.

The image memory 18 comprises a DRAM (Dynamic RAM), for example, and comprises a compression memory to temporarily store the compressed image data D3 and a page memory to temporarily store the uncompressed image data D3 before printing.

The HDD 19 is a functional unit to store various types of data in a hard disk. The HDD 19 stores a user information list 190 shown in FIG. 3B, a monitoring target user list 192 shown in FIG. 3C, and a history information table 194 shown in FIG. 4.

The user information list 190 is a data table for user authentication which stores the user information including the user name and the password. The control unit 10 requests a user to input the user information and obtains the input user information via the operation unit 11 when the job is executed.

The monitoring target user list 192 is a data table which stores the specific user names which are specified and registered in advance. When the user name which is authenticated by the user authentication matches with the user name stored in the monitoring target user list 192, the history information including the user name is read out from the HDD 19 and is immediately transferred to the administration server 3 without waiting until the periodical transfer of the history information.

Figure 4:
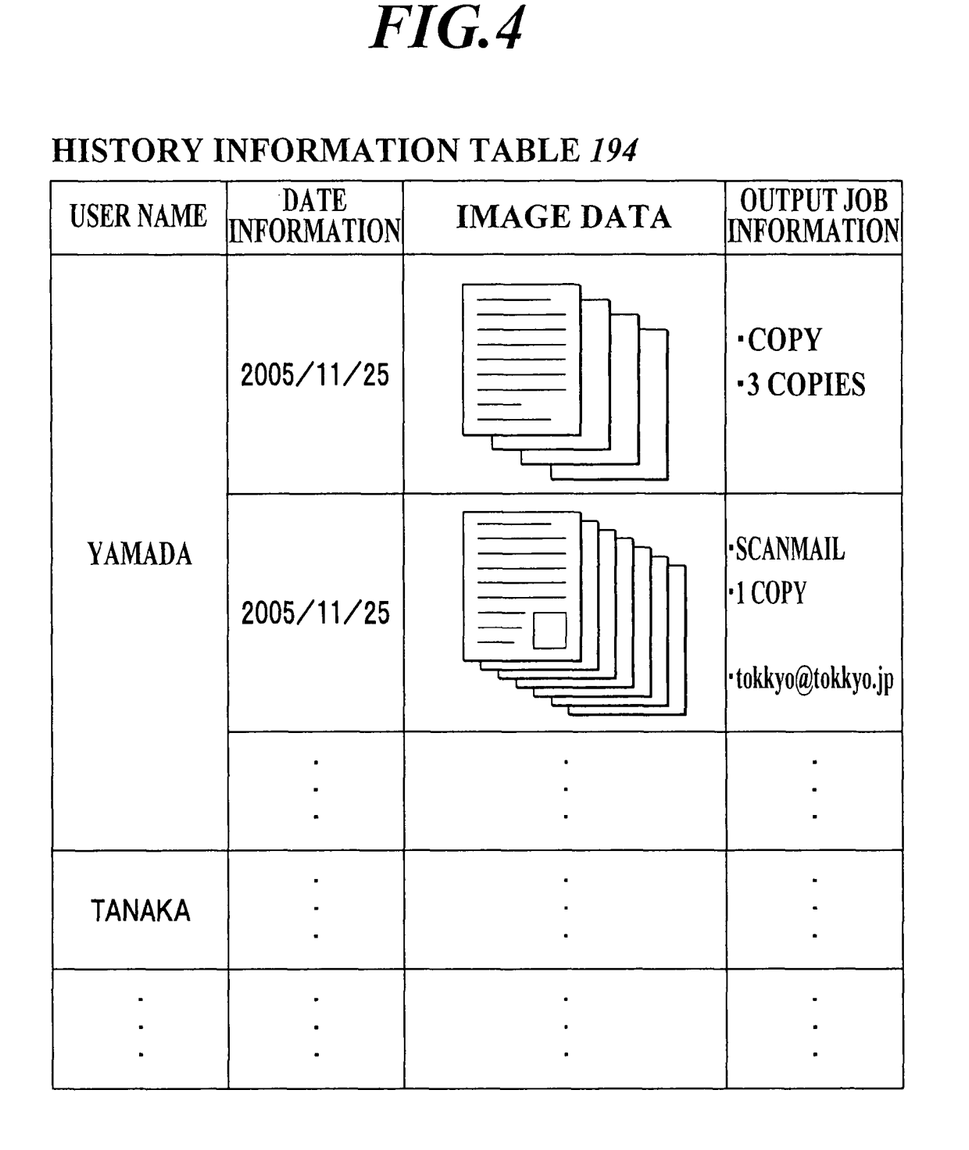
FIG. 4 is a diagram showing an example of the data structure of a history information table.

The history information table 194 is a data table which stores the usage history for every user of the MFP 1, and accumulates and stores the history information including the user name, date information which includes date and time, the image data, and output job information as shown in FIG. 4. When the control unit 10 outputs the image data D3, the control unit 10 obtains the date information of the time when the image is output and store the user name obtained by the user authentication, the image data D3, and the job information D1 in the history information table 194 as the history information so as to correspond to the date information.

When the image data D3 is stored in the history information table 194, the image data D3 is stored in the history information table 194 after being compressed and reduced.

For example, the image data D3 which is in the bit map format is compressed to a data in the JPEG (Joint Photographic Experts Group) format and its size is reduced to the thumbnail format. Further, when the job information D1 is stored in the history information table 194, the information needed for history management is obtained from the job information D1, and the obtained information is stored in the history information table 194 as the output job information. For example, information which are set in advance such as the job type (copy or scanmail) and number of output are obtained and stored.

The control unit 10 transfers the history information inside the history information table 194 to the administration server 3 according to the data transfer request which is transmitted from the administration server 3 in a predetermined time zone. Further, when the available space in the HDD 19 is not more than a predetermined space (for example, 1 GByte), the control unit 10 transmits the data transfer request to the administration server 3 and voluntary transfers the history information in the history information table 194 to the administration server 3.

When the control unit 10 starts to transfer the history information, the control unit 10 sets the above-mentioned job execution permission flag 170 to off and inhibits the execution of the next job during the transfer of the history information. Further, when the transfer of the history information table 194 is finished, the job execution permission flag 170 is set to on and the inhibition of job execution is released after the data in the history information table 194 is deleted.

In such way, the history management which is carried out when the image is output only includes the internal process of the MFP 1 in which the history information is temporarily stored in the HDD 19. Therefore, the above process can be carried out faster than the process of transferring the history information to the external administration server 3, and a load to the CPU can be reduced. Further, the accumulated history information is transferred in a lump for every certain period or when the available space in the HDD 19 is reduced. Thus, the influence of the process according to the transfer on the image output can be suppressed.

[Structure of the Administration Server]

Figure 5:
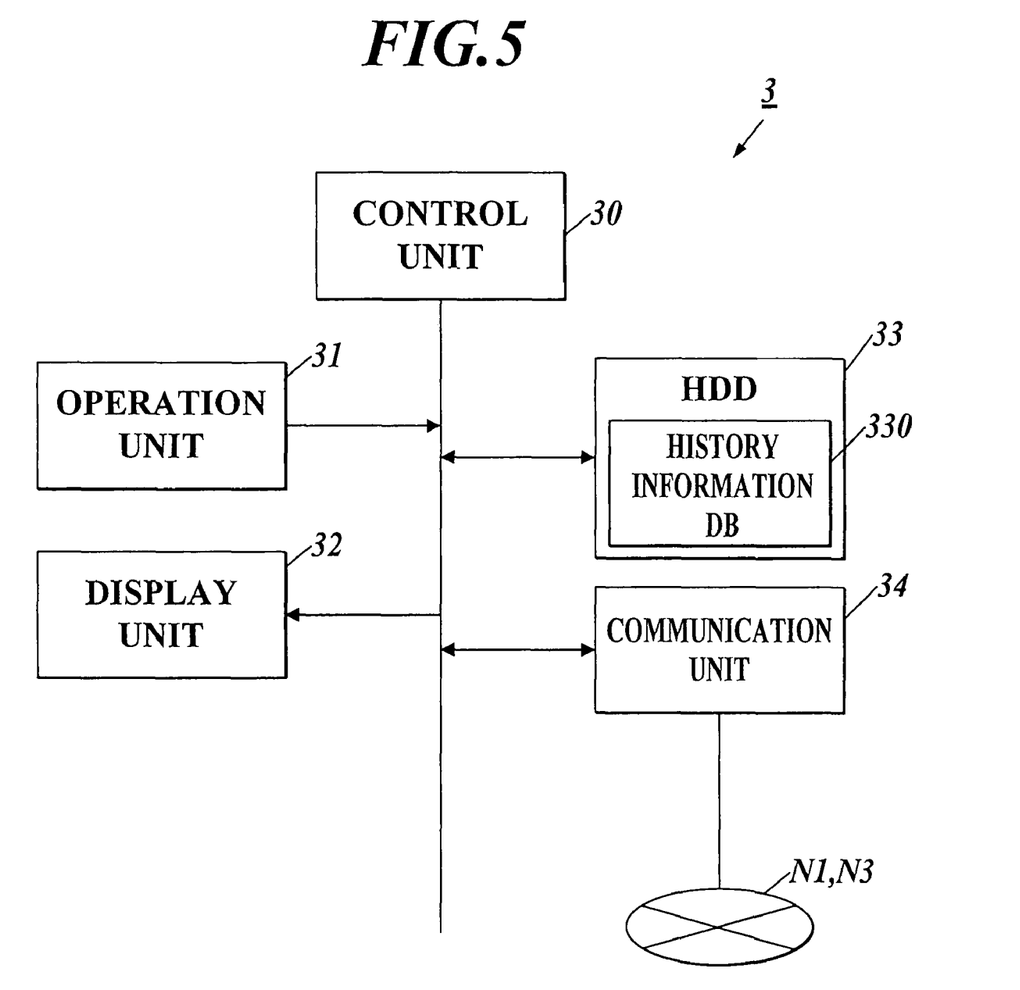
FIG. 5 is a block diagram showing an example of the functional structure of an administration server.

Next, the functional structure of an administration server 3 will be described with reference to FIG. 5. FIG. 5 is a block diagram showing an example of the functional structure of the administration server 3. According to FIG. 5, the administration server 3 comprises a control unit 30, an operation unit 31, a display unit 32, an HDD 33, and a communication unit 34.

The control unit 30 comprises a CPU, a ROM, a RAM, and the like, and controls the instructions given to each functional unit which composes the administration server 3, data communications between the functional units, and the like. More particularly, the CPU reads out a program from the ROM based on an operational signal which is output from the operation unit 31 and carries out the process according to the program. Further, the CPU temporarily stores the processing result in the RAM and allows the display unit 32 to display the processing result.

The operation unit 31 comprises a key board, a mouse, and the like, and outputs the push signal which corresponds to the pushed key and the operational signals such as a positional signal which corresponds to the position specified by the mouse and the like to the control unit 30. The display unit 32 comprises a CRT, a LCD, or the like, and displays various types of setting screens and image conditions based on the instructions/control from the control unit 30.

The communication unit 34 is a functional unit to carry out a data communication with external devices such as the MFP 1 and the like via the communication network which is the communication network N1 or the public network N3. The communication unit 34 comprises a modem, a LAN interface, or the like.

The HDD 33 is a functional unit to store various types of data in a hard disk, and stores the history information DB 330 as shown in FIG. 5. The history information DB 330 is a data base to store and manage the history information which is transferred from the MFP 1. The control unit 30 transmits the request (data transfer request) to start the data transfer to the MFP 1 when the predetermined time zone is reached, and stores the transferred history information in the history information DB 330.

When the history information is stored in the history information DB 330, the history information is stored by being sorted according to every user name, and directory management is carried out for the history information so that each of the information in the history information relates to one another based on each of the information included in the history information.

Here, the time zone in which the data transfer request is transmitted is preferred to be in a time period in which the MFP 1 is in low use (for example, AM0:00 to 1:00), and the time zone may be set in advance according to the user setting. Moreover, the time zone may be set by learning the time zone in which the history information is not stored based on the date information which is included in the history information transferred from the MFP 1.

[An Example of the Specific Operation of the Image Management System]

Figure 6:
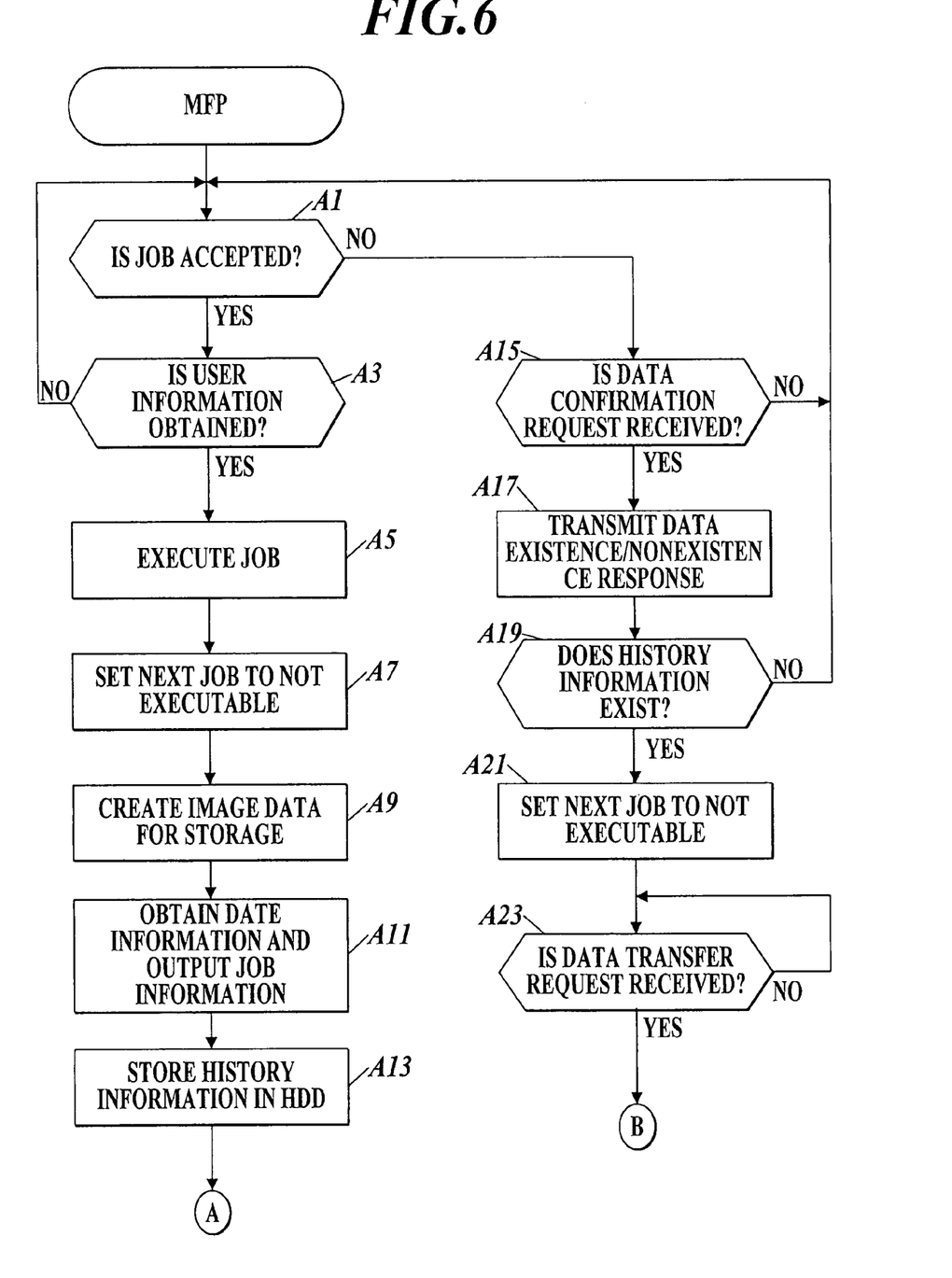
FIG. 6 is a first flowchart for explaining the specific operation of an MFP.
Figure 7:
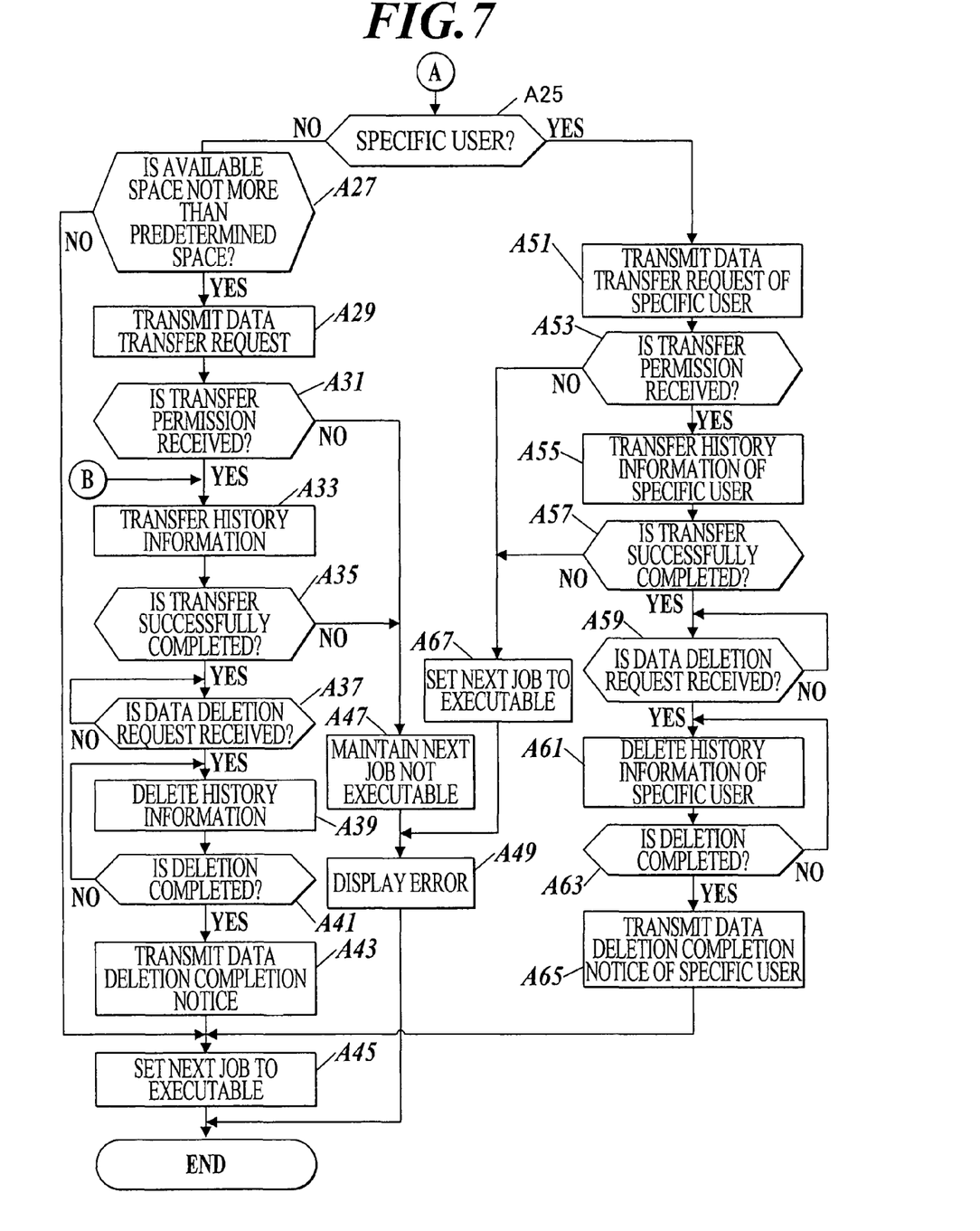
FIG. 7 is a second flowchart for explaining the specific operation of an MFP.
Figure 8:
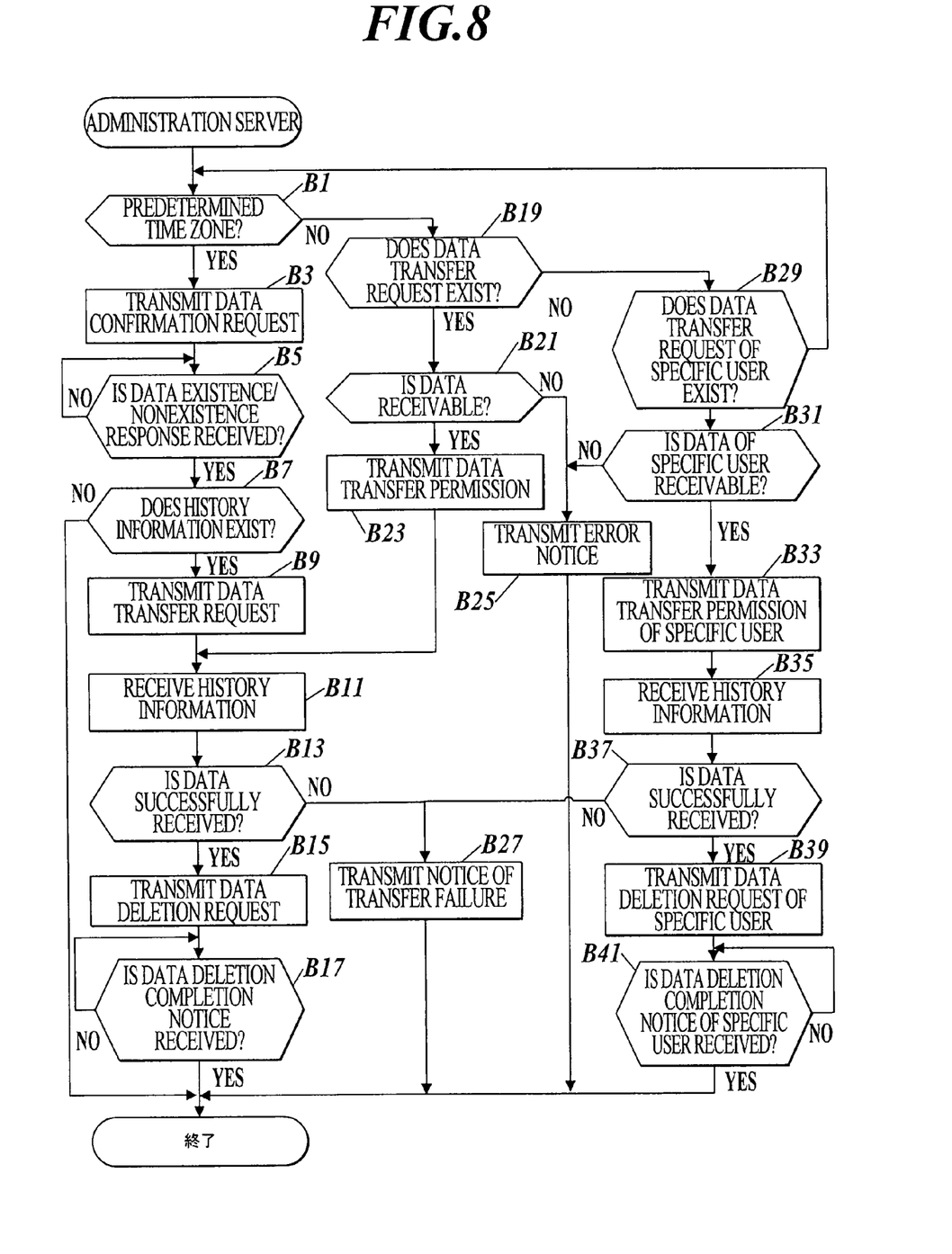
FIG. 8 is a flowchart for explaining the specific operation of an administration server.

Next, an example of the specific operation of the image management system S will be described with reference to the flowcharts shown in FIGS. 6 to 8 and the communication sequence shown in FIG. 9.

Figure 9:
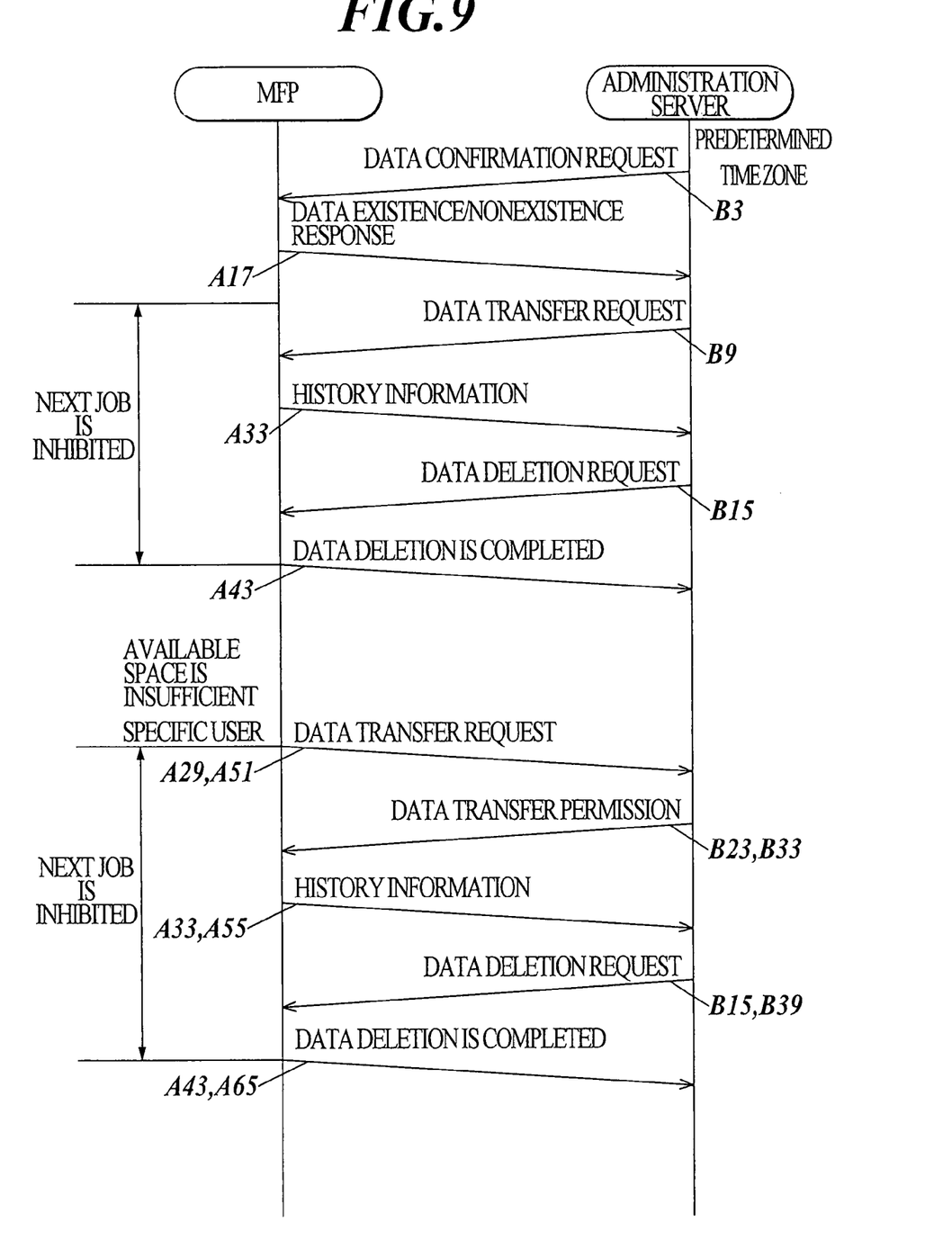
FIG. 9 is a diagram showing an example of the communication sequence of an image management system.

In the image management system S, the transfer of the history information from the MFP 1 is started by carrying out a predetermined communication process as shown in FIG. 9. The job execution permission flag 170 is set to off while the transfer of the history information and the deletion of the data are being carried out and the job execution is temporarily inhibited. The followings are patterns for starting the transfer of the history information: when the predetermined time zone is reached, when the available space in the HDD 19 is not more than a predetermined space, and when the job is executed by a specific user.

First, the transfer of the history information in the case where a predetermined time zone is reached will be described. The time is timed by the control unit 30 of the administration server 3. When it is determined that the time has reached the predetermined time zone (for example, AM0:00 to 1:00) (step B1; Yes), the data confirmation request to confirm whether the history information exists in the history information table 194 or not is transmitted to the MFP 1 (step B3).

When the control unit 10 of the MFP 1 receives the data confirmation request (step A15; Yes), the control unit 10 confirms whether the history information exists in the history information table 194 or not and transmits the response of existence or nonexistence (data existence/nonexistence response) to the administration server 3 (step A17). When the history information exists in the history information table 194 (step A19; Yes), the job execution permission flag 170 is set to off and the execution of the next job is inhibited (step A21) Then, the MFP 1 will be on standby until the data transfer request is received from the administration server 3 (step A23).

After the control unit 30 of the administration server 3 transmits the data confirmation request, when the data existence/nonexistence response is received from the MFP 1 (step B5; Yes), the control unit 30 determines whether the history information is stored in the MFP 1 side or not based on the data existence/nonexistence response (step B7). When the control unit 30 of the administration server 3 determines that the history information is stored in the MFP 1 side (step B7; Yes), the control unit 30 transmits the data transfer request for requesting to start the transfer of the history information to the MFP 1 (step B9) and starts receiving the history information (step B11).

On the other hand, when the control unit 10.of the MFP 1 receives the data transfer request (step A23; Yes), the process proceeds to step A33 and starts to transfer all the history information which is stored in the history information table 194 (step A33).

After the control unit 30 of the administration server 3 starts to receive the history information, the control unit 30 determines whether the history information is successfully received or not (step B13). As a method of determining whether the history information is successfully received or not, the known techniques may be appropriately applied besides the method of determining that the history information was successfully received when the data was received by a packet according to a communication protocol between the MFP 1 and the administration server 3 and an error was not detected by the CRC (Cyclic Redundancy Check) method, for example.

When the control unit 30 determined that the history information was not successfully received (step B13; No), the control unit 30 transmits a notice of transfer failure to the MFP 1 (step B27). When the control unit 30 determines that the history information is successfully received (step B13; Yes), the control unit 30 transmits the request (data deletion request) to delete all of the received history information from the HDD 19 to the MFP 1 (step B15). When the control unit 30 receives the data deletion completion notice which is transmitted from the MFP 1 (step B17; Yes), the process according to the flowchart of FIG. 8 is ended.

When the control unit 10 of the MFP 1 receives the notice of transfer failure which is transmitted from the administration server 3, the control unit 10 determines that the transfer of the history information has not completed successfully (step A35; No). The control unit 10 of the MFP 1 maintains the job not executable state in a state that the job execution permission flag 170 remain at off (step A47), and allows the display unit 12 to show a screen regarding the error (step A49).

Moreover, when the control unit 10 of the MFP 1 determines that the transfer of the history information has completed successfully (step A35; Yes), the MFP 1 will be on standby until the data deletion request is received from the administration server 3 (step A37).

When the control unit 10 of the MFP 1 receives the data deletion request (step A37; Yes), the control unit 10 deletes the transferred history information from the history information table 194 (step A39). Then, after the deletion is completed (step A41; Yes), the control unit 10 of the MFP 1 transmits the notice (data deletion completion notice) of completion of the data deletion to the administration server 3 (step A43). When the control unit 10 successfully carries out the transfer of the history information and the data deletion which are step A33 to step A43, the control unit 10 switches the job execution permission flag 170 to on and releases the inhibition of the execution of the next job (step A45).

Next, the transfer of the history information in the case where the available space in the HDD 19 is not more than a predetermined space and in the case where the job is executed by the specific user will be described.

First, when the control unit 10 of the MFP 1 detects that the start key is pushed by a user, the control unit 10 accepts the job, reads the document which is mounted on the scanner unit 13, and generates the image data D3. Then, the control unit 10 of the MFP 1 creates the job information D1 based on the user setting or the default setting and generates the job file F (step A1; Yes).

The control unit 10 of the MFP 1 allows the display unit 12 to display the input screen of the user name and the password which are the user information, waits for the input of the user name and the password, and obtains the input user name and the password when the input is detected. Then, the control unit 10 of the MFP 1 determines whether the password which corresponds to the obtained user name matches with the input password or not by referring to the user information list 190. When the control unit 10 determines that the password matches and that the user information in which the user authentication is OK is obtained (step A3; Yes), the control unit 10 executes the job such as the copy job, the scanmail job, or the like according to the user setting (step A5).

Subsequently, the control unit 10 inhibits the execution of the next job by setting the job execution permission flag 170 (step A7) and creates an image data which is to be store in the history information table 194 by compressing and reducing the image data D3 included in the job file F (step A9). The control unit 10 obtains the date information and the output job information (step A11), and stores the obtained user name, the date information, the compressed and reduced image data, and the output job information in the history information table 194 of the HDD 19 as the history information so as to correspond to one another (step A13).

Then, the control unit 10 determines whether the authenticated user is the specific user who is stored in the monitoring target user list 192 or not (step A25), and carries out the process which branches to step A27 or to step A51 according to the determination result. That is, when the user name obtained at the user authentication is stored in the monitoring target user list 192, the control unit 10 determines that the user is the specific user (step A25; Yes) and transmits the request (data transfer request) to start transfer the history information of the specific user to the administration server 3 (step A51).

On the other hand, when the control unit 30 of the administration server 3 determines that the data transfer request of the specific user is received from the MFP 1 (step B29; Yes), the control unit 30 determines whether the history information of the specific user is receivable or not based on the processing condition of the CPU of the particular machine and the available space in the HDD 33 (step B31).

For example, when other process of heavy load is being executed or when the available space in the HDD 33 is insufficient, the control unit 30 determines that the history information cannot be received (step B31; No), and transmits an error notice to the MFP 1 (step B25). Further, when the control unit 30 determines that the history information is receivable (step B31; Yes), the control unit 30 transmits the transfer permission of the data to the MFP 1 and starts to receive the history information which is being transferred from the MFP 1 side (step B35).

Meanwhile, when the control unit 10 of the MFP 1 receives the transfer permission from the administration server 3 (step A53; Yes), the control unit 10 reads out the history information including the user name of the specific user from the history information table 194 and transmits the history information to the administration server 3 (step A55) When the control unit 10 receives the error notice without receiving the transfer permission (step A53; No), the control unit 10 sets the job execution permission flag 170 to on and allows the display unit 12 to display the screen regarding the error (step A49) after releasing the inhibition of the execution of the next job (step A67).

On the other hand, similarly to step B13, the control unit 30 of the administration server 3 determines whether the history information is successfully received or not (step B37). When the control unit 30 determines that the history information is not successfully received (step B37; No), the process proceeds to step B27. When the control unit 30 determines that the history information is successfully received (step B37; Yes), the control unit 30 transmits the request (data deletion request) to delete the received data of the specific user to the MFP 1 (step B39). Subsequently, when the control unit 30 receives the data deletion completion notice which is transmitted from the MFP 1 (step B41; Yes), the process according to the flowchart of the FIG. 8 is ended.

Moreover, when the control unit 10 of the MFP 1 receives the notice of transfer failure which is transmitted from the administration server 3, the control unit 10 determines that the transfer of the history information has not completed successfully (step A57; No) and the process proceeds to step A67.

Here, when the transfer of the history information of the specific user fails (step A57; No), the process proceeds to step A47 and the execution of the next job may remain inhibited. In such case, execution of additional job by the specific user can be prevented.

Further, when the control unit 10 of the MFP 1 determines that the transfer of the history information has completed successfully (step A57; Yes), the control unit 10 waits until the data deletion request for the data of the specific user is received from the administration server 3 (step A59).

When the control unit 10 receives the data deletion request (step A59; Yes), the control unit 10 deletes the transferred history information of the specific user from the history information table 194 (step A61), and transmits the notice (data deletion completion notice) that the deletion of the data of the specific user has completed to the administration server 3 (step A65) after the deletion is completed (step A63; Yes). When the control unit 10 successfully carries out the transfer and the data deletion of the history information of the specific user which are step A51 to step A65, the control unit 10 switches the job execution permission flag 170 to on and releases the inhibition of execution of the next job (step A45).

In step A25, when the control unit 10 determines that the authenticated user is not the specific user who is stored in the monitoring target user list 192 (step A25; No), the control unit 10 obtains the available space in the HDD 19 and determines whether the available space has became not more than a predetermined space (for example, 1 GByte) (step A27). When the control unit 10 determines that the available space is not more than the predetermined space (step A27; Yes), the processes of step A29 to step A43 are carried out.

That is, the control unit 10 transmits the data transfer request for all of the history information included in the history information table 194 to the administration server 3 (step A29). When the control unit 10 receives the transfer permission from the administration server 3 (step A31; Yes), the control unit 10 reads out all the history information from the history information table 194 and transfers the information to the administration server 3 (step A33). Further, when the control unit 10 receives the error notice without receiving the transfer permission (step A31; No), the control unit 10 maintains the job not executable state by having the job execution permission flag 170 remain at off (step A47) and allows the display unit 12 to display the screen regarding the error (step A49).

On the other hand, when the control unit 30 of the administration server 3 determines that the data transfer request for all of the history information is received from the MFP 1 (step B19; Yes), similarly to step B31, the control unit 30 determines whether the history information is receivable or not (step B21). When the control unit 30 determines that the history information is not receivable (step B21; No), the control unit 30 transmits the error notice to the MFP 1 (step B25).

Moreover, when the control unit 30 determines that the history information is receivable (step B21; Yes), the control unit 30 transmits the transfer permission of the data (step B23), proceeds to step B11, and starts to receive the history information which is being transferred from the MFP 1 side (step B11).

The processes of step B13 to step B17 in the administration server 3 and the processes of step A35 to step A45 in the MFP 1 are described above. Therefore the descriptions are omitted.

As described above, according to the embodiment, each MFP 1 accumulates and stores the user name and the image data D3 in the history information table 194 as the history information for each job execution. Then, each MFP 1 transfers the information to the administration server 3 and deletes the information from the history information table 194. Therefore, the MFP 1 can be prevented from decreasing the processing rate thereof due to transfer of the history information to the administration server 3 for each image output and can be prevented from being overloaded due to the available space in the HDD 19 becoming insufficient.

Moreover, the administration server 3 stores and manages the history information which is transferred from the MFP 1. Therefore, when there is a plurality of MFP 1, the history information can be easily managed in the administration server 3 side without referring to the HDD 19 for each MFP 1. Accordingly, a management of the usage history by a user-friendly MFP 1 can be realized without slowing the processing rate of the image output of the MFP 1.

Further, the MFP 1 transfers the history information to the administration server 3 according to the data transfer request which is transmitted from the administration server 3 in a predetermined time zone, and the history information can be transferred in a lump in the time zone. Therefore, only the internal process of the MFP 1 such as storing of the history information in the HDD 19 needs to be carried out at the time of job execution and a process of carrying out data communication with the administration server 3 is not carried out. Thus, the processing time of the job execution is shortened. Accordingly, the MFP 1 can be prevented from constantly being overloaded due to the transfer of the history information.

Moreover, the history information which is transferred in the predetermined time zone is sequentially deleted from the HDD 19, and the history information is transferred and deleted when the available space in the HDD 19 becomes not more than the predetermined space because the usage frequency per day is high or the like. Thus, an available space of not less than a certain space is constantly assured in the HDD 19, and the usage history of the user can be surely stored. Accordingly, the MFP 1 can be prevented from being overloaded due to accumulation of the history information, and an influence of process of the history management on the job execution can be reduced.

Further, the history information is immediately transferred to the administration server 3 when the job was executed by the user whose user name is stored in the monitoring target user list 192. Thus, the history information including the registered user name can be sequentially managed in the administration server 3 side. For example, the usage history of a risky person who frequently uses the MFP 1 illegally can be managed in real time in the administration server 3 side.

Moreover, the job execution is temporarily stopped while the history information is being transferred. Thus, the process according to the transfer can be prevented from influencing the job execution. Further, the job execution is inhibited as-is when the transfer of the history information fails. Thus, occurrence of an unstable state of overflow in which the history information cannot be stored due to insufficiency of the available space in the HDD 19 can be avoided.

Further, the MFP 1 which accumulates and stores the history information at the time of output due to the image forming on the recording medium and the history information at the time of output due to transmission of the information to the communication network N1 and the public network N3 can be realized.

Moreover, the MFP 1 obtains the output job information which indicates conditions for the output relating to the image data and accumulates and stores the obtained output job information as the history information. Thus, the usage history such as how the image data was output can be managed in the administration server 3.

The above described embodiment is an example of applications of the present invention and the range of applicability is not limited to the above described embodiment. For example, the explanation is given for the case where the user information is obtained through the input of the user name and the password. However, for example, the user information may be obtained by a bar code input, or other user information such as a user ID or the like may be obtained.

Particularly, the user ID is converted to a bar code in advance and the bar code is issued to the user. Then, the MFP 1 further comprises a bar code reader, the user ID is obtained by decoding the bar code which is read by the bar code reader at the time of job execution, and the user ID corresponds to the image data D3 and is made to be the history information. In such way, the trouble for the user of inputting the user name and the password can be saved. Further, as a method for user authentication, the user information may be obtained by carrying out the fingerprint authentication using a fingerprint sensor, and the known techniques are appropriately adaptable.

Moreover, the administration server 3 obtains the data amount of the history information which is accumulated in the HDD 19 from the MFP 1, and the administration server 3 may start the transfer of the history information by transmitting the data transfer request when the data amount is not less than a predetermined amount. Particularly, the administration server 3 transmits the request to obtain the data amount instead of the data confirmation request in step B3. Meanwhile, the data amount of all the history information stored in the history information table 194 is calculated in the MFP 1 and is transmitted to the administration server 3.

In the administration server 3, it is determined whether the data amount received in step B7 is not less than the predetermined amount (for example, 1 GByte) or not. When it is determined that the data amount is not less than the predetermined amount, the data transfer request is transmitted to the MFP 1. In such way, the interval of the transfer of the history information can be spaced when usage frequency of the MFP 1 is low, and the transfer of the history information can be started according to the accumulation condition of the history information in the MFP side.

Moreover, the history information may be accumulated and stored when the print job which carries out the image forming based on the image data D3 which is transmitted from a personal computer is executed. In such case, a serial number or an IP address of the personal computer which is the sender of the image data D3 is obtained. This information may be stored as the user information so as to correspond to the image data D3, or the user information may be obtained by requesting the input of the user information in the personal computer side via the printer driver.

When the history information is stored in the HDD 19 in the MFP 1, the history information may be encrypted and stored, or the entire HDD 19 may be encrypted. In such way, manipulation of the data in the HDD 19 in the MFP 1 side can be prevented.

The present U.S. patent application claims the priority of Japanese Patent Application No. 2006-198131 filed on Jul. 20, 2006, according to the Paris Convention, and the above Japanese Patent Application is the basis for correcting mistranslation of the present U.S. patent application.

What is claimed is:

1. An image management system, comprising:
an image output apparatus which outputs an image data to various types of media; and
a server,
wherein the image output apparatus and the server are connected via a communication network,
wherein the image output apparatus comprises:
an obtaining unit to obtain user information when the image data is output,
a history storage unit to accumulate and store the user information which is obtained by the obtaining unit and the image data which is output as history information so as to correspond to one another,
a history transfer unit to transfer the history information which is stored in the history storage unit to the server,
a deletion unit to delete the history information which is transferred by the history transfer unit from the history storage unit, and
a request determination unit to determine whether the transfer request is received from the server or not, and
wherein the server comprises:
a receiving unit to receive the history information which is transferred from the image output apparatus,
a history management unit to accumulate and store the history information which is received by the receiving unit, and
a periodic request transmission unit to transmit a transfer request of the history information to the image output apparatus in a predetermined time zone, and
the history transfer unit comprises:
a periodic transfer unit to transfer the history information which is stored in the history storage unit to the server when the request determination unit determines that the transfer request is received.

2. An image management system, comprising:
an image output apparatus which outputs an image data to various types of media; and
a server,
wherein the image output apparatus and the server are connected via a communication network,
wherein the image output apparatus comprises:
an obtaining unit to obtain user information when the image data is output, a history storage unit to accumulate and store the user information which is obtained by the obtaining unit and the image data which is output as history information so as to correspond to one another,
a history transfer unit to transfer the history information which is stored in the history storage unit to the server,
a deletion unit to delete the history information which is transferred by the history transfer unit from the history storage unit,
a transfer completion determination unit to determine whether the transfer of the history information has completed successfully or not,
a first output stopping unit to stop the output of the image data while the history information is being transferred, and
a second output stopping unit to stop the output of the image data when the transfer completion determination unit determines that the transfer of the history information has not completed successfully, and
wherein the server comprises:
a receiving unit to receive the history information which is transferred from the image output apparatus, and
a history management unit to accumulate and store the history information which is received by the receiving unit.

3. The image management system of claim 2, wherein the image output apparatus further comprises:
a space obtaining unit to obtain an available space in the history storage unit, and
a space determination unit to determine whether the available space obtained by the space obtaining unit is not more than a predetermined space or not, and
the history transfer unit comprises:
a space insufficient occasion transfer unit to transfer the history information which is stored in the history storage unit to the server when the space determination unit determines that the available space is not more than the predetermined space.

4. The image management system of claim 2, wherein the image output apparatus further comprises:
a user information storage unit to store user information which is registered in advance, and
a user information determination unit to determine whether the user information obtained by the obtaining unit and the user information stored in the user information storage unit match or not, and
the history transfer unit comprises:
a registered user transfer unit to immediately transfer the history information which includes the user information stored in the history storage unit to the server.

5. The image management system of claim 2, wherein the output of the image data includes at least one of an output of an image data which is forming of an image on a recording medium based on the image data and an output of the image data which is transmission of the image data to the communication network.

6. The image management system of claim 2, wherein the obtaining unit further obtains output job information which indicates an output condition relating to the image data, and
the history storage unit further accumulates and stores the output job information as the history information so as to correspond to the user information and the image data.

7. An image output apparatus, comprising:
an obtaining unit to obtain user information when an image data is output to various types of media,
a history storage unit to accumulate and store the user information which is obtained by the obtaining unit and the image data which is output as history information so as to correspond to one another,
a history transfer unit to transfer the history information which is stored in the history storage unit to a server,
a deletion unit to delete the history information which is transferred by the history transfer unit from the history storage unit, and
a request determination unit to determine whether a transfer request from the server is received of not,
wherein the history transfer unit comprises a periodic transfer unit to transfer the history information which is stored in the history storage unit to the server when the request determination unit determines that the transfer request is received.

8. An image output apparatus, comprising:
an obtaining unit to obtain user information when an image data is output to various types of media,
a history storage unit to accumulate and store the user information which is obtained by the obtaining unit and the image data which is output as history information so as to correspond to one another,
a history transfer unit to transfer the history information which is stored in the history storage unit to a server,
a deletion unit to delete the history information which is transferred by the history transfer unit from the history storage unit,
a transfer completion determination unit to determine whether the transfer of the history information has complete successfully or not,
a first output stopping unit to stop the output of the image data while the history information is being transferred, and
a second output stopping unit to stop the output of the image data when the transfer completion determination unit determines that the transfer of the history information has not completed successfully.

9. The image output apparatus of claim 8, further comprising:
a space obtaining unit to obtain an available space in the history storage unit, and
a space determination unit to determine whether the available space obtained by the space obtaining unit is not more than a predetermined space or not, and
the history transfer unit comprises a space insufficient occasion transfer unit to transfer the history information which is stored in the history storage unit to the server when the space determination unit determines that the available space is not more than the predetermined space.

10. The image output apparatus of claim 8, further comprising:
a user information storage unit to store user information which is registered in advance, and
a user information determination unit to determine whether the user information obtained by the obtaining unit and the user information stored in the user information storage unit match or not, and
the history transfer unit comprises a registered user transfer unit to immediately transfer the history information which includes the user information stored in the history storage unit to the server when the user information determination unit determines that the user information match.

11. The image output apparatus of claim 8, wherein
the output of the image data includes at least one of an output of an image data which is forming of an image on a recording medium based on the image data and an output of the image data which is transmission of the image data to the communication network.

12. The image output apparatus of claim 8, wherein
the obtaining unit further obtains output job information which indicates an output condition relating to the image data, and
the history storage unit accumulates and stores the output job information as the history information so as to correspond to the user information and the image data.

13. A non-transitory computer readable medium for embodying a program, wherein the program causes a computer to realize functions as:
an obtaining unit for obtaining user information when an image data is output to various types of media,
a history storage unit for accumulating and storing the user information which is obtained by the obtaining unit and the image data which is output as history information so as to correspond to one another,
a history transfer unit for transferring the history information which is stored in the history storage unit to a server, and
a deletion unit for deleting the history information which is transferred by the history transfer unit from the history storage unit,
wherein
the program causes the computer to further realize a function as a request determination unit for determining whether a transfer request from the server is received or not, and
the history transfer unit comprises a periodic transfer unit to transfer the history information which is stored in the history storage unit to the server when the request determination unit determines that the transfer request is received.

14. A non-transitory computer readable medium for embodying a program, wherein the program causes a computer to realize functions as:
an obtaining unit for obtaining user information when an image data is output to various types of media,
a history storage unit for accumulating and storing the user information which is obtained by the obtaining unit and the image data which is output as history information so as to correspond to one another,
a history transfer unit for transferring the history information which is stored in the history storage unit to a server, and
a deletion unit for deleting the history information which is transferred by the history transfer unit from the history storage unit,
wherein the program causes the computer to further realize functions as:
a transfer completion determination unit for determining whether the transfer of the history information has completed successfully or not,
a first output stopping unit for stopping the output of the image data while the history information is being transferred, and
a second output stopping unit for stopping the output of the image data when the transfer completion determination unit determines that the transfer of the history information has not completed successfully.

15. The computer readable medium of claim 14, wherein the program causes the computer to further realize functions as:
a space obtaining unit for obtaining an available space in the history storage unit, and
a space determination unit for determining whether the available space obtained by the space obtaining unit is not more than a predetermined space or not, and
the history transfer unit comprises:
a space insufficient occasion transfer unit to transfer the history information which is stored in the history storage unit to the server when the space determination unit determines that the available space is not more than the predetermined space.

16. The computer readable medium of claim 14, wherein the program causes the computer to further realize functions as:
a user information storage unit for storing user information which is registered in advance, and
a user information determination unit for determining whether the user information obtained by the obtaining unit and the user information stored in the user information storage unit match or not, and
the history transfer unit comprises:
a registered user transfer unit to immediately transfer the history information which includes the user information stored in the history storage unit to the server when the user information determination unit determines that the user information match.

17. The computer readable medium of claim 14, wherein
the output of the image data includes at least one of an output of an image data which is forming of an image on a recording medium based on the image data and an output of the image data which is transmission of the image data to the communication network.

18. The computer readable medium of claim 14, wherein
the obtaining unit further obtains output job information which indicates an output condition relating to the image data, and
the history storage unit further accumulates and stores the output job information as the history information so as to correspond to the user information and the image data.

* * * * *